(No Model.)
C. FALLESEN.
WAGON SPRING.
No. 298,456. Patented May 13, 1884.
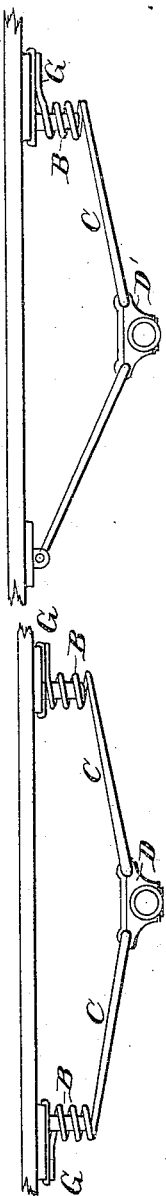
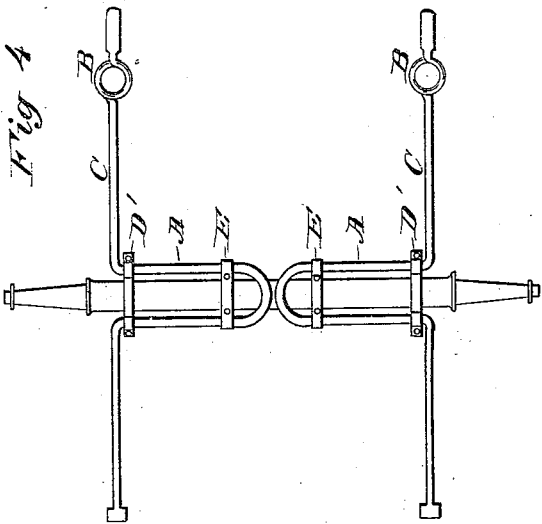
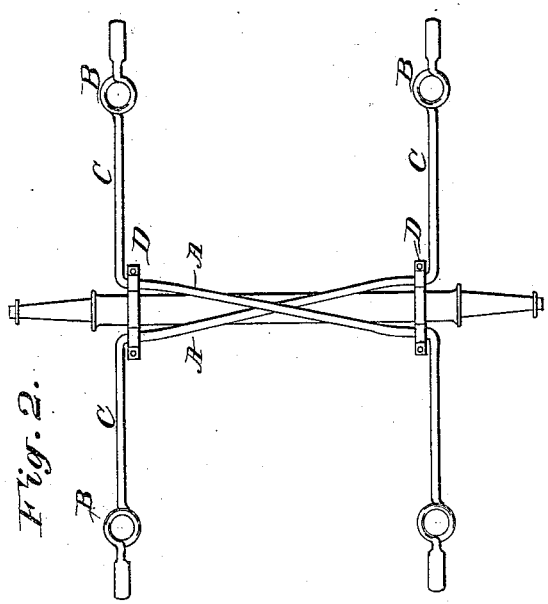
Witnesses
A. W. Steiger.
A. B. Moore.
Inventor
Christian Fallesen
By David A. Burr
Attorney.

UNITED STATES PATENT OFFICE.

CHRISTIAN FALLESEN, OF BROOKLYN, NEW YORK.

WAGON-SPRING.

SPECIFICATION forming part of Letters Patent No. 298,456, dated May 13, 1884.

Application filed November 23, 1883. (No model.)

*To all whom it may concern:*

Be it known that I, CHRISTIAN FALLESEN, of Brooklyn, Kings county, State of New York, have invented a new and useful Improvement in Wagon-Springs; and I do hereby declare that the following is a full and exact description thereof, reference being had to the accompanying drawings, and to the letters of reference marked thereon, making a part of this specification.

My invention relates to the class of springs for vehicles which operate by torsion.

It consists in combining with a wagon-spring constructed of a long bar of metal whose two ends are each bent to project in opposite directions in parallel planes, so as to act, under the weight of the body of the vehicle to which they are attached, as levers upon the bar, twisting it in opposite directions, and at the same time counterbalancing each other, one or more spiral coils formed or fitted upon one or both ends of the bar to project in a plane transverse to that in which the end of the bar plays, so as to form an auxiliary spiral spring.

In the accompanying drawings, Figure 1 is a side elevation, and Fig. 2 a plan view, of my improved spring in simple form. Fig. 3 is a side elevation, and Fig. 4 a plan view, of a modification thereof.

A is a long bar of spring-steel, whose ends are first bent each in an opposite direction at about a right angle with the central portion, and with an upward inclination, to form arms C C, adapted to support the body of the vehicle.

B is a spiral spring formed or secured upon the end of the bar at a right angle to its length. The coils of this spiral are preferably formed out of the bar itself, but may be made independently thereof and made fast thereon, and either one or both ends of the torsional bar may thus be fitted with auxiliary coils.

The spring-bars A A are designed to be used in pairs. When the main length thereof is left straight, the bars are fitted longitudinally over the axle of the vehicle to intersect thereon, and are secured thereto at either end in boxes or bearings D D, fixed to the axle, so that the arms of each pair of springs shall extend in opposite directions in the same vertical plane and be free to rock in said bearings, as shown in Fig. 2. As a modification thereof, each spring-bar may be doubled upon itself centrally, so as to bring its two arms, extending in opposite directions, both in the same vertical plane, as shown in Fig. 4, in which case the springs are secured to operate independently, one at each end of the axle, the arms being confined in bearings D D and the rear curved end fixed upon the axle by means of a transverse bar, E, the advantage of this form of my springs being that they may be fitted indifferently to an axle of any length to suit any width of truck or wagon-bed without change in the form of the arms, such as is required in case the intersecting springs shown in Fig. 2 are fitted to a wagon whose bed or body is wider or narrower than the length of the spring. One end of each of the compound springs is preferably hinged or secured in the customary manner to the body of the vehicle, its opposite end being confined thereto in a sliding bearing, G, or to a shackle, which will permit a limited longitudinal movement thereof as the arm gives and extends out under the pressure of the load thereon.

In operation, when the load of the wagon and its contents is brought to bear upon the springs, the downward pressure upon the auxiliary terminal coils B B will bring them into action to support a light load with the required elastic play; but so soon as the load increases, its weight, brought to bear upon the arms C C, causes them to twist the intervening bar, whose resiliency is thus brought effectively into play in supporting the load.

This form of spring is especially adapted for use under express-wagons and market-wagons, and other vehicles in which the load varies, being at times light and again very heavy.

I claim as my invention—

The combination, with a torsional-spring bar, and with an arm extending therefrom in a plane at about a right angle with its length, of an auxiliary spiral spring formed or fitted at the end of said arm, to operate by compression, substantially in the manner and for the purpose herein set forth.

In testimony whereof I have signed my name to this specification in the presence of two subscribing witnesses.

CHRISTIAN FALLESEN.

Witnesses:
  NELSON MERRILL,
  DAVID A. BURR.